United States Patent
Bruyere et al.

(10) Patent No.: US 6,476,946 B1
(45) Date of Patent: Nov. 5, 2002

(54) CHANNEL ADD AND DROP METHOD AND SYSTEM FOR WAVELENGTH-DIVISION MULTIPLEX OPTICAL TRANSMISSION

(75) Inventors: Franck Bruyere, Paris (FR); Amaury Jourdan, Sevres (FR); Jorge Daloura, Longpont sur Orge (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/416,263

(22) Filed: Oct. 12, 1999

(30) Foreign Application Priority Data

Oct. 15, 1998 (FR) .............................................. 98 12935

(51) Int. Cl.[7] ................................................ H04J 14/02
(52) U.S. Cl. ........................ 359/127; 359/128; 359/130; 385/24
(58) Field of Search ................................. 359/127, 128, 359/130, 124; 385/24, 37, 16, 17

(56) References Cited

U.S. PATENT DOCUMENTS

| | | | | |
|---|---|---|---|---|
| 6,038,045 A | * | 3/2000 | Sotom et al. ................ | 359/128 |
| 6,038,046 A | * | 3/2000 | Kaneko et al. .............. | 359/130 |
| 6,069,719 A | * | 5/2000 | Mizrahi ....................... | 359/124 |
| 6,084,694 A | * | 7/2000 | Milton et al. ................ | 359/124 |
| 6,108,468 A | * | 8/2000 | Kaneko et al. ................ | 385/24 |
| 6,173,093 B1 | * | 1/2001 | Jeal .............................. | 385/24 |

FOREIGN PATENT DOCUMENTS

| | | |
|---|---|---|
| EP | 0 734 129 A2 | 9/1996 |
| EP | 0 844 757 A2 | 5/1998 |
| EP | 0 862 071 A1 | 9/1998 |
| WO | WO 98/08322 | 2/1998 |

* cited by examiner

*Primary Examiner*—Leslie Pascal
*Assistant Examiner*—Hanh Phan
(74) *Attorney, Agent, or Firm*—Sughrue Mion, PLLC

(57) ABSTRACT

A selection module receives an upstream multiplex and selectively diverts at least one channel of the multiplex to a drop port. A switching unit directs the channel concerned to an add port during certain periods in order to reinsert it into a downstream multiplex including at least one other channel of the upstream multiplex. An amplifier has sufficient gain to give rise to a circulating wave during the aforementioned periods in a closed loop including the two ports and the unit. This wave balances the downstream multiplex. Applications include fiber optic telecommunication networks.

16 Claims, 2 Drawing Sheets

CHANNEL ADD AND DROP METHOD AND SYSTEM FOR WAVELENGTH-DIVISION MULTIPLEX OPTICAL TRANSMISSION

BACKGROUND OF THE INVENTION

1. Field of the invention

The invention is in the field of optical transmission using wavelength-division multiplexes. It concerns in particular a method for selectively adding and/or dropping one or more channels of a multiplex.

Such operations are useful in routing and switching functions. For example, they can be used to modify the information on one or more channels or to change the wavelength of a channel carrying information. An add and drop system performing these operations is usually referred to as an optical add and drop multiplexer (OADM).

2. Description of the Prior Art

The method of the present invention includes the following operations disclosed in patent document EP-A-0 838 918 published on Apr. 29, 1998, although the terminology used in the following description of these operations differs from that used in the above document:

information to be transmitted being carried by a plurality of channels, some of said channels are assembled to form an upstream multiplex, the channels of that multiplex being distributed in the wavelength spectrum, the channels of the upstream multiplex are separated in a selection module into at least one dropped group and one transit group, the dropped group is diverted to a lateral circuit, at least during reinsertion periods, at least a part of the dropped group is diverted to an optical amplifier, this amplifier constituting a lateral amplifier, and the transit group is assembled with said part of the dropped group to form a downstream multiplex.

The reinsertion periods occur when the dropped group has not been modified.

In practise, the lateral circuit causes an unwanted loss of power from the dropped group. In any transmission system it is desirable for each multiplex to be balanced, i.e. for all the channels of the multiplex to be at substantially the same power. In the usual case where the upstream multiplex is balanced, a general problem therefore arises of balancing the downstream multiplex, and a more particular problem is to achieve this balancing during said reinsertion periods despite said losses in the lateral circuit.

The following solutions to this more particular problem might be considered.

In a first solution, the selection module offers the transit channel group a circuit that is not used by the drop channel group. This circuit then includes an attenuator for compensating the losses in the lateral circuit, possibly with the aid of the lateral amplifier. This first solution has two drawbacks, one being that the power of the channels would be lower in the downstream multiplex than in the upstream multiplex, which would require an amplifier at the output of the selection module, and the other being that this module would be more complex and costly than the usual modules.

In a second solution, the gain of the lateral amplifier is varied in order to compensate for the losses in the lateral circuit. This second solution is not described in patent document EP-A 0 838 918, which indicates for this amplifier only a switching function, and the multiplication factor defining the gain of an amplifier implementing this function is typically 0 to open an optical circuit including the amplifier or 1 to transmit the optical waves without changing their power. It would have the drawback that the initial setting of the gain of the amplifier would be difficult and that the compensation of losses might then be disrupted by modifications of this gain caused by variations in the power of the upstream multiplex and/or by drift of the specifications of the amplifier itself or by the units pumping it.

A third solution is described in an article by F. Shehadeh, R. S. Vodhanel, M. Krain, C. Gibbons, R. E. Wagner and M. Ali: "Gain-Equalized, Eight-Wavelength WDM Optical Add-drop Multiplexer with an 8-dB Dynamic Range", IEEE Photonics Technology Letters, vol. 7, N° Sep. 9, 1995, pp 1075–1077: the channels of the outgoing multiplex of the add and drop system are separated from each other in a demultiplexer, after which the power of each of the channels is adjusted to a common value, after which the channels are superposed to constitute a balanced downstream multiplex. This solution has the drawback of being costly.

A particular object of the present invention is to find a method of balancing the outgoing multiplex of an add and drop system permanently and at low cost when a multiplex received by the system is balanced and the system extracts some of the channels from the received multiplex and then reinserts the same channels into the outgoing multiplex. A more general object of the present invention is to prevent a system of the above kind modifying the ratios of the respective powers of the channels of a multiplex when some channels are dropped and then added in this way.

It exploits two facts to achieve the above objects. One of these facts is that prior art optical amplifiers that can be used for the lateral amplifier are progressive saturation amplifiers, i.e. have a gain that decreases with the total power of the optical waves received by the amplifiers to be amplified therein. The other fact is that, in the low-cost modules constituting the selection module of prior art add and drop systems, optical waves could be guided in a channel different to those used in the prior art systems.

SUMMARY OF THE INVENTION

The invention consists in a method of dropping and adding channels for use in wavelength-division multiplex optical transmission, the method including the following operations:

information to be transmitted being carried by a plurality of channels, some of the channels being assembled to form an upstream multiplex, and the channels of the multiplex being distributed in the wavelength spectrum, the channels of the upstream multiplex are separated in a selection module into at least one dropped group and one transit group, the dropped group is diverted to a lateral circuit, at least during reinsertion periods, at least a part of the dropped group is diverted to an amplifier system having a progressive saturation gain, and the transit group is assembled with the part of the dropped group to form a downstream multiplex, in which method the gain of the amplifier system is made sufficient to give rise to an optical wave in the lateral circuit and the amplifier system at the same time as the part of the dropped group, the selection module being adapted to enable the wave to circulate in a closed loop further including the module and the wave constituting a loop wave, and a preferred wavelength for the loop wave is outside a spectrum occupied by the channels.

The invention also consists in an add and drop system adapted to receive an upstream multiplex made up of channels divided in wavelength in a transmission spectrum, the system including:

a selection module separating the channels of the upstream multiplex into at least one dropped group and one transit group and forming a downstream multiplex by assembling the transit group with an added group received by the module and consisting of at least one channel at a different place in the spectrum of wavelengths than the transit group, and a lateral unit adapted to form a lateral circuit transmitting at least a part of the dropped group to the selection module to constitute the added group so that the added group then constitutes a reinserted group, the lateral circuit including an amplifier system having a progressive saturation gain, in which system the gain of the amplifier system has values sufficient to give rise to an optical wave in the lateral circuit and the amplifier system at the same time as the reinserted group, the selection module enabling the wave to circulate in a closed loop also including the module, the wave constituting a loop wave, the loop constituting a gain adjustment loop, and the system further including a spectrum locking element in the gain adjustment loop and favoring a wavelength external to the transmission spectrum so as to impose on the loop wave a wavelength also external to the spectrum.

Various embodiments of the invention are described hereinafter with the aid of the accompanying drawings. If a component is shown in more than one figure, it is always designated therein by the same reference letters and/or numerals.

DETAILED DESCRIPTION OF THE PREFERRED EMBODIMENTS

Figure 1:
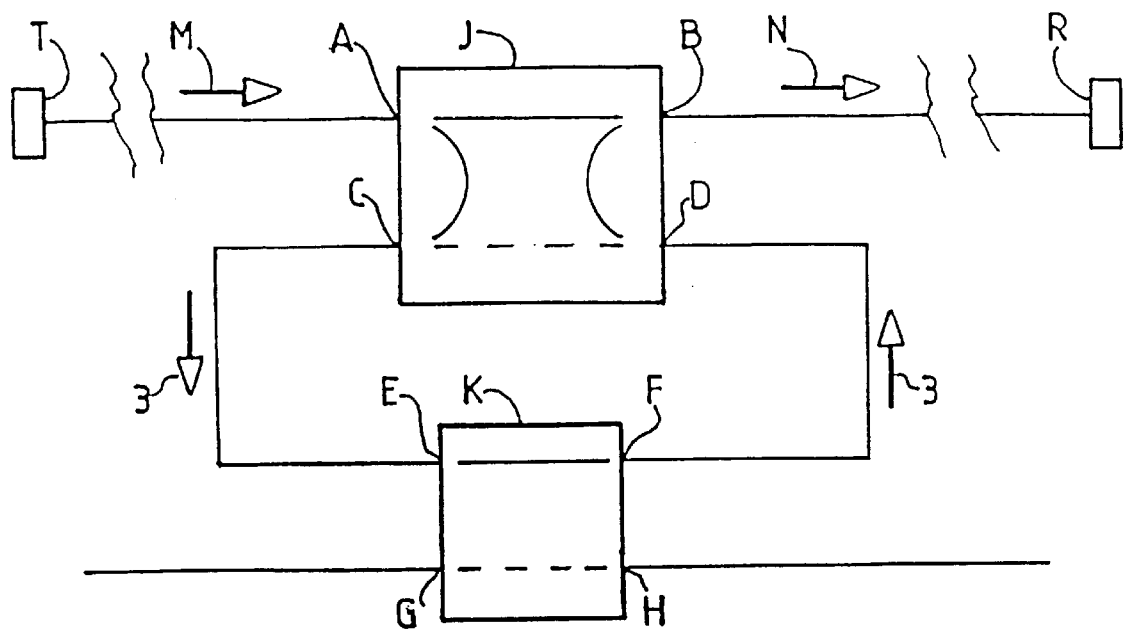
FIG. 1 shows one configuration of a prior art transmission system, this configuration applying during a reinsertion period.
Figure 2:
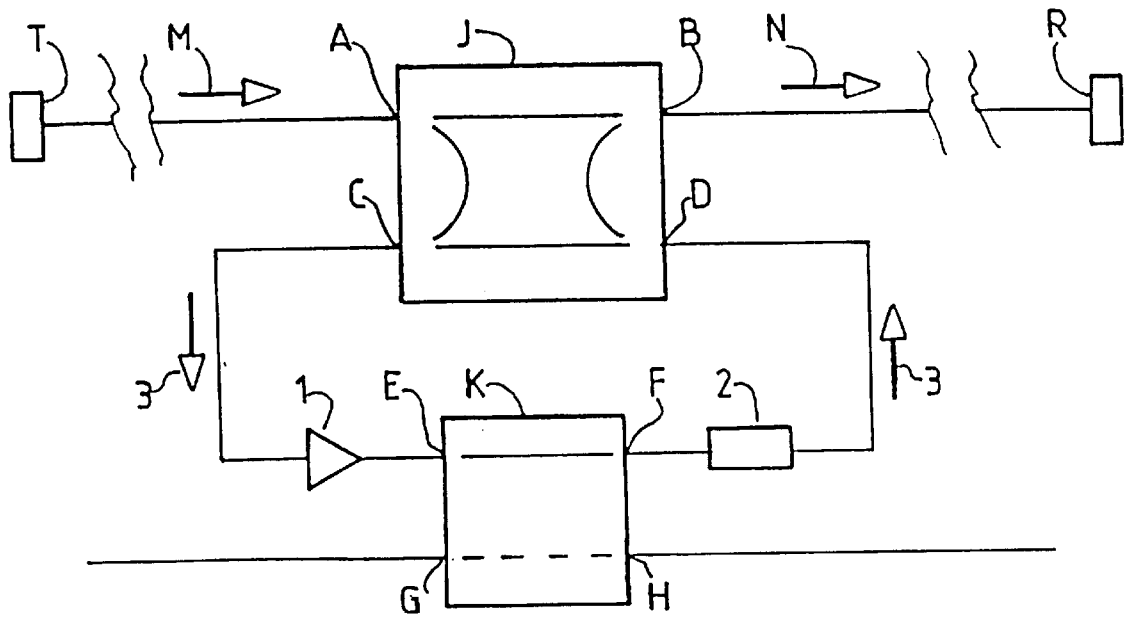
FIG. 2 shows one configuration of a transmission system including an add and drop system of the present invention, this configuration applying during a reinsertion period.

Each of the systems shown in FIGS. 1 and 2 transmits multiplexes each comprising a plurality of channels. These channels consist of optical waves carrying information to be transmitted. They are in respective predetermined bands of wavelengths, all the bands being within a predetermined spectrum referred to hereinafter as the transmission spectrum. Each channel typically comprises a carrier wave which has its own, single wavelength. However, the wave is modulated by a signal to be transmitted or by a plurality of such signals which can be time-division multiplexed, which widens its spectrum, which can occupy the entire spectrum of the channel. The multiplexes and the channels are guided within these systems, which incorporate optical fibers for this purpose, at least for transmission over long distances.

Each of the two systems includes the following components:

Transmitter means T which receive information to be transmitted and produce therefrom a multiplex which is transmitted via an optical fiber to an add and drop system J, K. The multiplex received by this system constitutes an upstream multiplex M. The transmitter means are such that the channels of the multiplex have respective input powers at most equal to predetermined maximum input powers. The maximum input power is typically the same for all the channels.

The add and drop system J, K, which receives the upstream multiplex and supplies another multiplex constituting a downstream multiplex N. The upstream and downstream multiplexes typically use the same bands of wavelengths. However, the positions in the spectrum or the sizes of these bands of wavelengths can cause differences between the two multiplexes and some bands may be empty in one of them.

Receiver means R which receive the downstream multiplex via another optical fiber and supply in response the information to be transmitted carried by the channels of that multiplex.

The components of the add and drop system include a selection module J and a lateral unit K.

The selection module J defines a "selected spectrum segment". This segment constitutes a portion of the transmission spectrum. It can contain one or more of the bands of wavelengths. These bands can be adjacent or separated from each other by other bands, which need not be in the same segment.

The module has two ports respectively constituting a main input A to receive the upstream multiplex and a main output B to supply the downstream multiplex. It has two further ports respectively constituting a drop port C and an add port D. It is adapted to select the group comprising all the channels of the upstream multiplex which are not in the selected spectrum segment and to guide that group along a transit channel from the main input A to the main output B, this group constituting a transit group. It is also adapted to select the group of all the channels of the upstream multiplex which are in the selected spectrum segment and to guide that group along a drop channel extending from the main input to the drop port C, this group constituting a dropped group. It is further adapted to guide optical waves along an add channel extending from its add port D to the main output B when the waves are in the selected spectrum segment, these waves constituting an added group. The added group includes at least one channel. The downstream multiplex comprises the transit group and the added group. The selection module is also adapted to guide optical waves along a retrograde guide channel extending from its add port to its drop port when the waves are not in the selected spectrum segment. To allow for the non-preferred situation in which the guide channel is subject to losses or includes an amplifier, it is considered hereinafter that the channel divides the power of the waves by a loss factor constituting a retrograde guide loss factor. This factor is typically equal to 1 but can be greater than 1, or less than 1 if there is an amplifier in the module.

Figure 3:
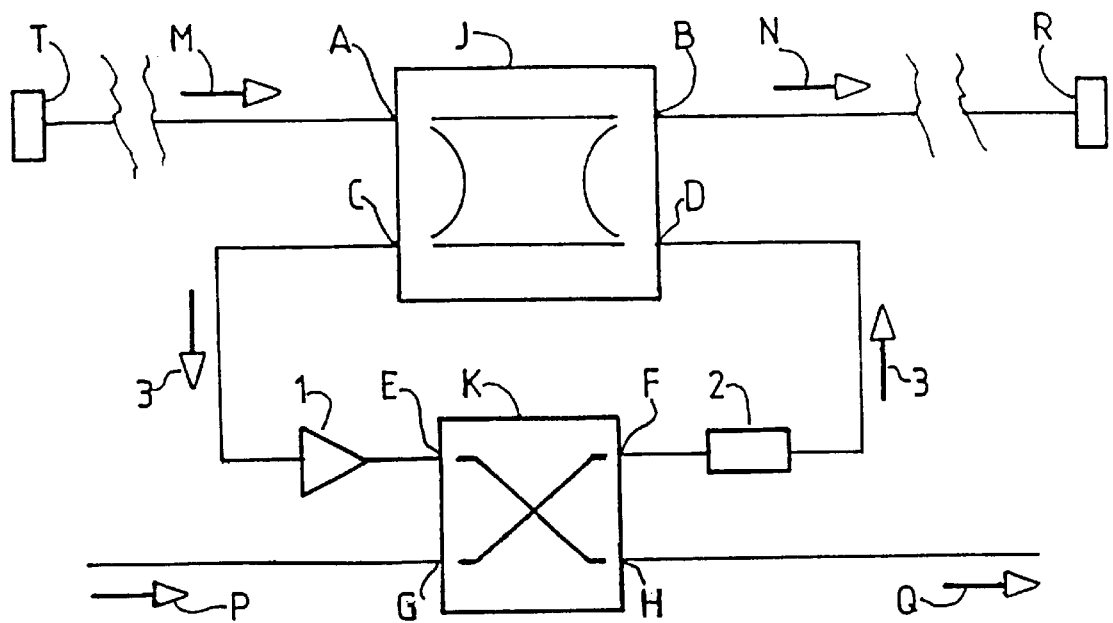
FIG. 3 shows a configuration of the system from FIG. 2 applying outside reinsertion periods.

In FIGS. 1, 2 and 3 the above guide channels are symbolized by lines inside the module, the lines being continuous or dashed according to whether the channels are used or not. Although the lines are entirely separate from each other in the figures it should be understood that the usual selection modules provide only optical wave channels, each section of which is common to more than one channel. Such channel sections are described hereinafter with reference to the modules shown in FIGS. 3 and 4.

The lateral unit K has at least two ports constituting a drop port E and an add port F. The drop port E is connected to the drop port C of the selection module to receive the dropped group. During reinsertion periods, the unit K transmits the dropped group from its drop port E to its add port F. Its add port is connected to the add port of the selection module so that this unit then forms a part of the open lateral circuit C-E-F-D extending from the drop port C to the add port D of the selection module via the unit.

Because of this circuit, the transmitted dropped group can constitute said added group. This drop and added group is referred to hereinafter as a reinserted group.

The lateral unit is typically a switch unit K which has two further ports respectively constituting a lateral input G and a lateral output H. During reinsertion periods it is placed in a direct transmission state which is shown in FIGS. 1 and 2 and in which it transmits the dropped group from its drop port E to its add port F. Outside these periods, it is placed in a crossed transmission state shown in FIG. 3. In this state it transmits the dropped group from its drop port E to the lateral output H and/or it receives at its lateral input G a group to be added consisting of at least one channel in the selected spectrum segment. It then transmits the group to be added from its lateral input to its add port F so that the group to be added constitutes said added group, i.e. so that this group is added to the downstream multiplex by the selection module J.

However, the lateral unit could have other functions without departing from the scope of the invention. For example, it could monitor a frequency or waveform characteristic of the signals carried by the reinserted group.

The lateral circuit C-E-F-D includes lossy elements and amplifying elements.

The lossy elements divided the power of the reinserted group by a lateral loss factor greater than 1. In a preferred embodiment of the invention, the lossy elements are part of the lateral unit K.

The amplifying elements include at least one optical amplifier constituting a lateral amplifier and constitute an amplifier system.

Figure 6:
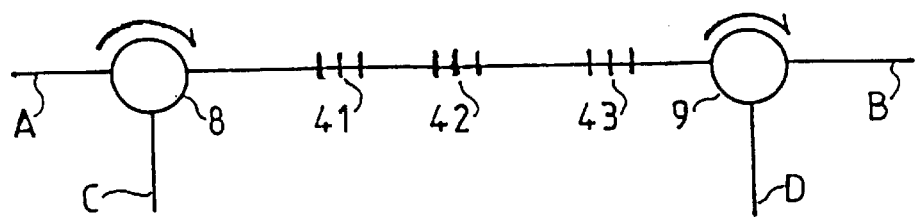

In the preferred embodiment of the invention shown in FIGS. 2 and 6, there is a single lateral amplifier outside this unit. In a different embodiment, not shown, a lateral amplifier could constitute a switch in a switching lateral unit such as unit K and possibly be accompanied by another lateral amplifier outside the unit K, as in the prior art system from FIG. 1.

Furthermore, a transmission system can include a plurality of add and drop systems in accordance with this invention, such as the systems J, K, adapted to receive a plurality of multiplexes, such as the upstream multiplex M, via a plurality of optical fibers, and to supply a plurality of multiplexes, such as the downstream multiplex N, via a plurality of other optical fibers, respectively. In this case, each system would include at least one lateral amplifier such as the amplifier 1 which is advantageously of the optically pumped type. All the systems would then preferably include a single pumping unit common to a corresponding set of lateral amplifiers.

Each lateral amplifier, such as the amplifier 1, has a gain curve and is adapted to receive optical waves and to transmit those waves with the power of each wave multiplied by a gain defined by the curve for each of the values of a power at the input of the amplifier, this input power being the sum of the powers of the waves to be amplified received by that amplifier. Each channel received by a lateral amplifier therefore has a power at most equal to a current maximum power relating to that amplifier and defined on the basis of said maximum input power of the channel by the losses and gains of the components of the lateral circuit which precede the amplifier in the circuit. When the system of the invention is in service, the input power has a current value which can be constant or vary. The gain of the lateral amplifier is then a current gain whose value is defined at all times by the gain curve for the current value of the input power.

In the simple situation in which the lateral circuit includes a single amplifier and the lossy components are in the circuit downstream of the amplifier, the current powers of the channel are the same as their input powers. In a more complex situation in which a second amplifier is preceded by lossy components and a first amplifier, the maximum current powers relating to the second amplifier for each channel are equal to the maximum input power divided by a loss factor of the lossy components and multiplied by a current gain of the first amplifier. As a result of this the respective gain curves of all the lateral amplifiers define a lateral gain for each set of values of the respective input powers of the amplifiers, this lateral gain being the product of all the gains respectively defined by these curves for those values. The lateral gain therefore decreases as the input powers increase. If d current lateral gain is the gain defined by the gain curves for all the current values of the input powers, it is clear that, between the input and the main output of the system, the power of the reinserted group is divided by the lateral loss factor and multiplied by the current lateral gain, whereas the power of the transit group may be unchanged.

The system of the present invention is characterized by the fact that the gain curves of the lateral amplifiers such as the amplifier 1 define a lateral gain greater than a loop loss factor consisting of the product of the retrograde guide loss factor by the lateral loss factor, this gain being defined for a set of input power values constituting a maximum initial set. The input power value of each of the lateral amplifiers is equal in this maximum initial set to the sum of the current maximum powers of the channels received by the amplifier, the current maximum powers being those relating to that amplifier.

The gain curve characteristics defined by the present invention are obtained by the choice of the lateral amplifier(s) and/or by the choice of the electrical or optical pumping powers of the amplifiers. This choice does not require any accurate adjustment because it is sufficient for a value of the lateral gain to be greater than a threshold, this value being the value defined by the gain curves for input powers equal to the current maximum powers of the reinserted group. The threshold may be known in advance or determined experimentally, or even not specifically determined if the level of at least one of the gain curves is progressively raised to the point at which a loop wave grows (see below). In practise, it is advantageous to increase this level sufficiently to create a safety margin such that any drop in the gains of the lateral amplifiers in time causes no risk of the lateral gain falling below the threshold. Such reduction in the gain can result from deterioration of the characteristics of the amplifier itself, or its pumping unit, which reduces the level of its gain curve, or from an unplanned increase in the powers of the multiplex.

To describe the effect of this feature of the invention, it is necessary to consider an initial situation in which the input power of each lateral amplifier is merely the sum of the powers of the channels received by the amplifier. In this situation, this feature creates an excess lateral gain relative to the lateral loss factor, regardless of the variations in the input power of the channels within the limit of their maximum values. This excess gain has two consequences. A first consequence is that the reinserted group is amplified in a relative manner by the excess gain, which creates an imbalance of power in respect of the group in the downstream multiplex. A second consequence of the excess gain relates to the fact that the add and drop system enables some optical waves to travel in a closed loop C-E-F-D-C. The waves concerned are those external to the selected spectrum segment. The loop passes through the drop port of the selection module and then follows the lateral circuit C-E-F-D as far as the add port D of the module, then passing through the module to reach its drop port C. In the initial situation the excess gain is present in the closed loop. It therefore creates an optical wave in the loop by the laser effect. This wave is external to the selected spectrum segment and constitutes the loop wave. Its power is then added to that of the channels of the dropped and reinserted groups to constitute the input powers of the lateral amplifiers. The initial situation defined above is therefore neither desirable nor stable. It can be achieved, but in a transient manner. As soon as it is achieved, the loop wave increases in power. The input powers of the lateral amplifiers therefore increase, which progressively decreases the lateral gain and the excess gain. The loop wave stops growing when the excess gain that gave rise to it cancels out, i.e. when the lateral gain is equal to the loop loss factor. The loop wave then maintains the lateral gain at the some value as this factor even if the latter varies slightly with time. The loop it travels might be called the "gain adjustment loop".

In the preferred embodiment, the transit group does not suffer any loss of amplification and the losses suffered by the reinserted group are the same as those suffered by the loop wave. In the situation in which the upstream multiplex was also balanced, the present invention therefore achieves permanent and automatic balancing of the downstream multiplex in a simple manner. In practise this is achieved to the extent that the losses suffered by the reinserted group are localized within the lateral unit. In other cases, in which the dropped group suffers losses in the selection module, the balancing of the downstream multiplex can be less precise but still advantageous.

Spurious coupling between the transit group and the loop wave could occur in the selection module. For this reason the add and drop system further includes a spectrum locking unit 2 in the gain adjustment loop. This unit favors a wavelength outside said transmission spectrum in order to impose on the loop wave a wavelength that is also outside the spectrum and constitutes a loop wavelength. In the preferred embodiment, it is a band-pass filter connected in series into the lateral circuit C-E-F-D. It has a sufficiently weak selectivity not to introduce excessive losses in the reinserted group, but its selectivity is high enough to impose a suitable predetermined loop wavelength.

This solution has the advantage of simplicity. Of course, the skilled person will be able to conceive of many other solutions. Thus, in other embodiments, this unit could be in parallel with the amplifier in the lateral circuit, or in series in the selection module.

Figure 4:
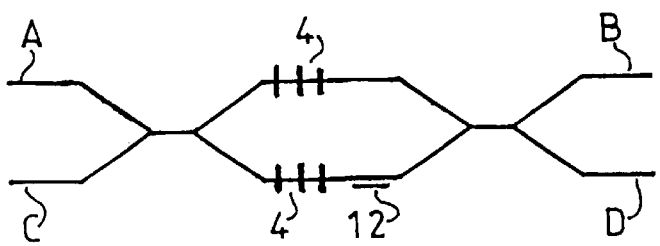
FIGS. 4, 5 and 6 respectively show first, second and third embodiments of a selection module of the system from FIGS. 2 and 3.

Various embodiments of the selection module will now be described: in the embodiment shown in FIG. 4, the selection module takes the form of a fiber optic Mach-Zehnder interferometer in which each of the two branches includes a photo-written Bragg grating constituting a rejection filter 4. The interferometer is balanced by treatment with ultra-violet radiation in a segment 12 of one branch to adjust the wave propagation speed therein. In all the embodiments using a filter of this kind the selected spectrum segment is the one reflected by the filter. In this embodiment, the transit channel has two sections A-4 and 4-B, the drop channel has two sections A-4 and 4-C, the add channel has two sections D-4 and 4-B, and the retrograde guide channel has two sections D-4 and 4-C, each of these sections being divided over part of its length between the two branches of the interferometer.

Figure 5:
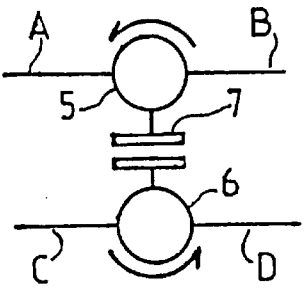

In FIG. 5, the selection module includes two optical circulators 5 and 6 on respective opposite sides of a Fabry-Pérot resonator 7 constituting a band-pass filter. The selected spectrum segment is the one transmitted by the filter. The transit channel includes the sections A-5, 5-7, 7-5 and 5-B. The drop channel includes the sections A-5, 5-7, 7-6 and 6-C. The add channel includes the sections D-6, 6-7, 7-5 and 5-B. The retrograde guide channel includes the sections D-6, 6-7, 7-6 and 6-C. The gain adjustment loop follows the path C-E-F-D-6-7-6-C, the ports E and F being those of the lateral unit K connected between the ports C and D, and not shown. The direction of propagation of the waves is imposed by a lateral amplifier or by an optical isolator, not shown.

FIG. 6 shows a currently preferred embodiment of the selection module. Measurements have been carried out on an add and drop system including this module. The module included three rejecter filters 41, 42 and 43 connected in series between two optical circulators 8 and 9 and respectively tuned to the center wavelengths of three channels R1, R2 and R4 in an upstream multiplex. These three channels constituted the reinserted group. Another channel R3 in the multiplex constituted the transit group. The column headed WL in the table below shows the four channels and their center wavelength in nanometers. The columns PA, PB1 and PB2 give the powers of the corresponding channels in dB, as respectively measured at the main input A, the main output B with no amplifier and the same output with an erbium-doped fiber lateral amplifier included in accordance with the present invention.

| WL | PA | PB1 | PB2 |
| --- | --- | --- | --- |
| R1: 1549.32 | +2.6 | −30.2 | −9.2 |
| R2: 1552.52 | +2.5 | −30.2 | −8.9 |
| R3: 1555.75 | +3.1 | −7.9 | −7.9 |
| R4: 1558.98 | +3.1 | −29.9 | −8.2 |

The invention reduced the imbalance of the downstream multiplex from 22.3 dB to 1.3 dB. If the imbalance of the upstream multiplex is taken into account, it is apparent that this embodiment reduced the imbalance introduced by the add and drop system to 0.8 dB.

What is claimed is:

1. A method of dropping and adding channels for use in wavelength-division multiplex optical transmission, the method comprising:

transmitting information using a plurality of channels, wherein a portion of said channels are assembled to form an upstream multiplex, said channels of said upstream multiplex being spectrally distributed, and said channels of said upstream multiplex being separated in a selection module into at least one dropped group and one transit group, diverting said dropped group to a lateral circuit, at least during reinsertion periods, diverting at least a part of said dropped group to an amplifier system having a progressive saturation gain, and assembling said transit group with said part of said dropped group to form a downstream multiplex, wherein the gain of said amplifier system is sufficient to create an optical wave in said lateral circuit and said amplifier system at the same time as said part of said dropped group, said selection module being adapted to enable said optical wave to circulate in a closed loop further comprising said selection module and said optical wave constituting a loop wave, and a preferred wavelength for said loop wave that is outside a spectrum occupied by said channels.

2. The method claimed in claim 1, wherein said lateral circuit comprises a switching unit used outside said reinsertion periods to separate said dropped group from said upstream and downstream multiplexes or to add to said downstream multiplex said channels other than those of said upstream multiplex and substituted at least in part for said dropped group.

3. The method claimed in claim 1, wherein said lateral circuit comprises a switching unit used outside said reinsertion periods to separate said dropped group from said upstream and downstream multiplexes and to add to said downstream multiplex said channels other than those of said upstream multiplex and substituted at least in part for said dropped group.

4. An add and drop system adapted to receive an upstream multiplex made up of channels divided in wavelength in a transmission spectrum, said system comprising:

a selection module separating said channels of said upstream multiplex into at least one dropped group and one transit group and providing a downstream multiplex by assembling said transit group with an added group received by said module and comprising of at least one channel at a different place in said spectrum of wavelengths than said transit group, and a lateral unit providing a lateral circuit transmitting at least a part of said dropped group to said selection module as said added group so that said added group comprises a reinserted group, said lateral circuit comprising an amplifier system having a progressive saturation gain that creates an optical wave in said lateral circuit and said amplifier system at the same time as said reinserted group, said selection module enabling said wave to circulate in a closed loop that comprises said selection module, said optical wave constituting a loop wave, said closed loop comprising a gain adjustment loop, and said system further comprising a spectrum locking element in said gain adjustment loop and favoring a wavelength external to said transmission spectrum so as to impose on said loop wave a wavelength also external to said transmission spectrum.

5. The system claimed in claim 4, wherein said selection module provides three channels respectively guiding said transit group, said dropped group and said added group, each of said channels being made up of sections and each of said sections of said channel guiding said transit group being also a section for one of said two channels respectively guiding said dropped group and said added group.

6. The system claimed in claim 5, wherein said selection module comprises a drop and add module incorporating a rejecter filter.

7. The system claimed in claim 4, wherein said lateral unit is a switching unit adapted on command to assemble said reinserted group to said transit group to comprise said downstream multiplex or to separate said extracted group from said upstream and downstream multiplexes or to add to said downstream multiplexes channels other than those of said upstream multiplex.

8. The system claimed in claim 4, wherein said spectrum locking element is a band-pass filter connected in series in said lateral circuit and said band-pass filter imposing a predetermined wavelength on said loop wave.

9. The system claimed in claim 4, wherein said lateral unit is a switching unit adapted on command to assemble said reinserted group to said transit group to comprise said downstream multiplex and to separate said extracted group from said upstream and downstream multiplexes or to add to said downstream multiplexes channels other than those of said upstream multiplex.

10. The system claimed in claim 4, wherein said selection module comprises a fiber optic Mach-Zehnder interferometer.

11. The system claimed in claim 10, wherein said interferometer comprises two branches, each branch comprising a Bragg grating rejection filter.

12. The system claimed in claim 11, wherein one branch of said interferometer further comprises a balancing segment that controls wave propagation speed.

13. The system claimed in claim 4, wherein said selection module comprises:

a first optical circulator;

a bandpass filter coupled to an output of said first optical circulator; and a second optical circulator coupled to said bandpass filter.

14. The system claimed in claim 13, wherein said bandpass filter is a Fabry-Pérot resonator.

15. The system claimed in claim 4, wherein said selection module comprises:

a first optical circulator;

a plurality of rejecter filters coupled in series, said plurality of rejecter filters being coupled to an output of said first optical circulator; and a second optical circulator coupled to said plurality of rejecter filters.

16. The system claimed in claim 15, wherein at least one of said plurality of rejecter filters is tuned to the center wavelength of at least one of said channels.

* * * * *